(12) United States Patent
Katz (10) Patent No.: US 7,222,113 B2
(45) Date of Patent: May 22, 2007

(54) METHOD AND SYSTEM FOR A SOFTWARE AGENT CONTROL ARCHITECTURE

(75) Inventor: Edward P. Katz, Saratoga, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 708 days.

(21) Appl. No.: 10/253,201

(22) Filed: Sep. 23, 2002

(65) Prior Publication Data

US 2004/0059698 A1   Mar. 25, 2004

(51) Int. Cl.
*G06F 17/00* (2006.01)
*G06N 5/02* (2006.01)
(52) U.S. Cl. .................... 706/47; 706/46; 706/48; 706/49; 706/50; 707/1; 717/101; 294/82.1
(58) Field of Classification Search ............ 706/46–50; 707/1; 700/49; 717/101; 294/82.1
See application file for complete search history.

(56) References Cited

U.S. PATENT DOCUMENTS

| | | | | |
|---|---|---|---|---|
| 6,032,142 | A * | 2/2000 | Wavish | 706/47 |
| 6,314,555 | B1 * | 11/2001 | Ndumu et al. | 717/101 |
| 6,490,574 | B1 * | 12/2002 | Bennett et al. | 706/47 |
| 6,493,695 | B1 * | 12/2002 | Pickering et al. | 706/47 |
| 2002/0049691 | A1 * | 4/2002 | Majoor | 706/47 |
| 2003/0004912 | A1 * | 1/2003 | Pant et al. | 706/47 |
| 2003/0141730 | A1 * | 7/2003 | Sawtelle et al. | 294/82.1 |

OTHER PUBLICATIONS

Katz, E. (2002) A Multiple Rule Engine-Based Agent Control Architecture. IEEE: International Conference on Intelligent Engineering Systems. pp. 1-6.*
Nakashima, H. & Noda, I. (1998) Dynamic Subsumption Architecture for Programming Intelligent Agents. IEEE. Multi Agent System. pp. 190-197.*

* cited by examiner

*Primary Examiner*—Anthony Knight
*Assistant Examiner*—Sunray Chang (57) ABSTRACT

A computer-implemented method and system for implementing a software agent control architecture. The method includes the step of generating a plurality of agents, wherein the agents are respectively configured to implement a rule-based behaviour. Respective rule sets for each of the agents are accessed, wherein the rule sets are configured for processing using respective rule engines of each of the agents. Respective incoming messages are received and delivered to the agents. The rule-based behaviour for each of the agents is implemented by processing the incoming messages using the rule engines.

18 Claims, 7 Drawing Sheets

METHOD AND SYSTEM FOR A SOFTWARE AGENT CONTROL ARCHITECTURE

TECHNICAL FIELD

The present claimed invention relates to analysis of a computer program. More specifically, the present claimed invention relates to the runtime analyzing of application and library functions.

BACKGROUND ART

Software based agents are increasingly being used to provide a variety of sophisticated functions and services to users. Generally, the term "agent" refers to a software routine that executes on one or more computer system platforms, usually in the background, and performs an action when a specified event occurs. For example, in a business setting, agents could transmit a summary file on the first day of the month or monitor incoming data and alert the user when a certain transaction has arrived. Software agents can also be designed to roam a distributed network, such as the Internet, in order to gather or distribute information. Depending upon the context of their use and the complexity of the functions they perform, agents are also referred to as "intelligent agents" or "personal assistants."

Although software based agents can provide a variety of sophisticated functions and services, there exists a number of problems in using them efficiently. One such problem involves the fact that the design and implementation of sophisticated agent based systems for particular problems is a difficult, work intensive task. For example, when initially developing new agent-based systems, there are often specific needs which if they can be addressed will facilitate the development effort (e.g., avoiding the need to completely restart system development with each new problem). One particular need is the fact that prior art agent development environments do not provide adequate agent prototyping. There currently exists no prior art agent development environment that provides for ease of prototyping multiple, heterogeneous agents. Such agents can be used to construct agent-based applications where each has its own specialization and capabilities. There currently exists no prior art agent development environment that efficiently supports behaviour reuse. For example, behaviour reuse is needed not only to facilitate prototyping but also to allow modular construction of new composite behaviours for the different agent instances. Additionally, there currently exists no prior art agent architecture that adequately supports goal directed task processing. Goal-directed task processing among multiple concurrent goals is essential for the particular agent systems of interest. As used herein, the term "goal" is used to mean a goal-directed task in which there is a goal is to be achieved and there are already known methods for satisfying the goal which may be hierarchical.

Therefore, clearly there is a need for a better approach for implementing a software agent control architecture.

DISCLOSURE OF THE INVENTION

The present invention provides a method and system for implementing a software agent control architecture.

Specifically, in one computer implemented method embodiment, a software agent control architecture is instantiated, wherein a plurality of agents are generated, and wherein the agents are respectively configured to implement a rule-based behaviour. Respective rule sets for each of the agents are accessed, wherein the rule sets are configured for processing using respective rule engines of each of the agents. Respective incoming messages are received and delivered to the agents. The rule-based behaviour for each of the agents is implemented by processing the incoming messages using the rule engines.

These and other technical advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Embodiments of the present invention provide a method and system for implementing a software agent control architecture. Specifically, in one computer implemented method embodiment, a software agent control architecture is instantiated, wherein a plurality of agents are generated, and wherein the agents are respectively configured to implement a rule-based behaviour. Respective rule sets for each of the of the agents are accessed, wherein the rule sets are configured for processing using respective rule engines of each of the agents. Respective incoming messages are received and delivered to the agents. The rule-based behaviour for each of the agents is implemented by processing the incoming messages using the rule engines. Additional development of new agent-based systems is aided by the fact that complex behaviour can be implemented through the layering of rules. This aspect also facilitates the rapid prototyping agent based systems and the modular construction of new composite behaviours for different agent instances.

Additionally, embodiments of the present invention can implement a multiple rule engine agent architecture intended for prototyping heterogeneous agents. This same architecture can also be used for concurrent and hierarchical goal processing. One embodiment of the architecture has an embedded main rule engine supporting goal processing as well as providing high level decision and control for the agent. The architecture also possesses a mechanism for dynamically spawning rule engine-based agent behaviours (e.g., using separate rule engines) to process subgoals, and it maintains information/status communication channels between the main rule engine and the rule-based agent behaviours. The agent together with its agent behaviours can be realized in a similar manner. Each embedded rule engine has the ability to configure multiple agent behaviours either in parallel or hierarchically. In addition, this approach allows the construction of reusable, rule-based agent capabilities that can easily be composed and layered to achieve a specific, application-oriented composite capability.

Figure 1:
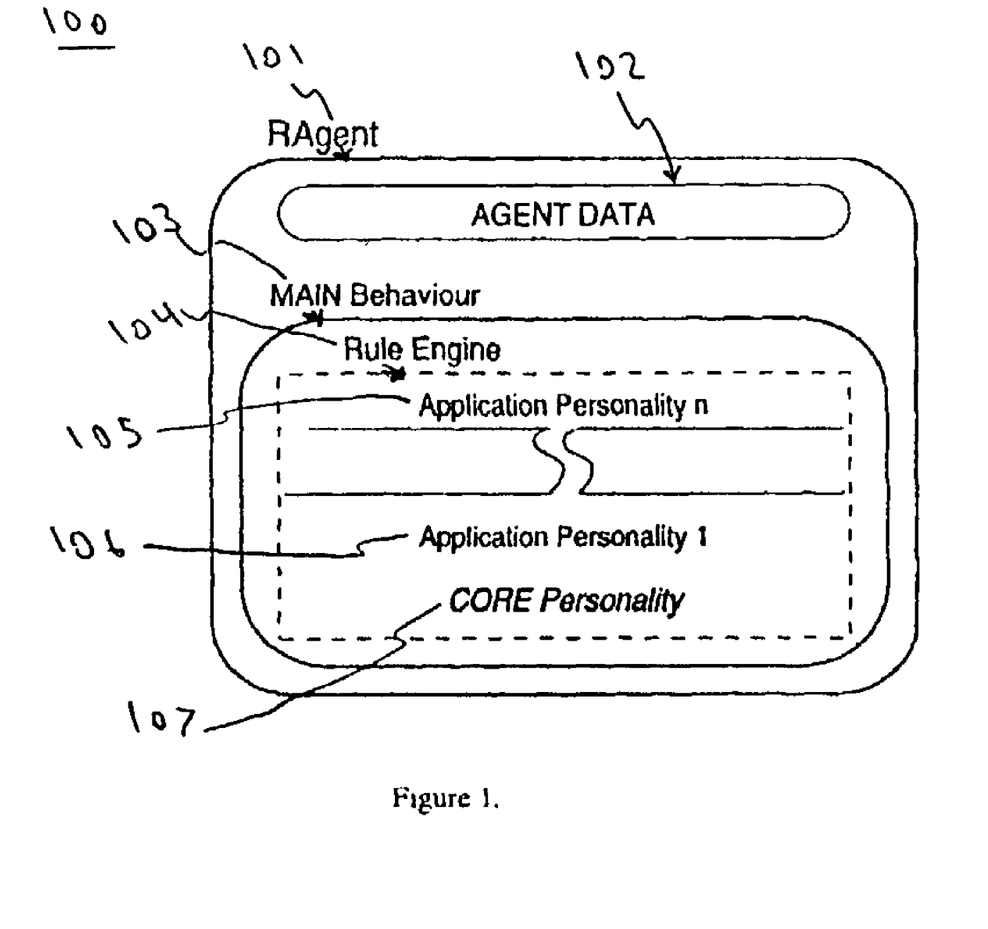
FIG. 1 shows a diagram of a rule engine agent architecture in accordance with one embodiment of the present invention.

FIG. 1 shows a diagram of a rule engine agent architecture 100 in accordance with one embodiment of the present invention. As depicted in FIG. 1, a rule agent 101 (e.g., RAgent) is shown including agent data 102 and a main behaviour component 103. The main behaviour component 103 includes a rule engine 104. The rule engine 104 is comprised of a plurality of different application personalities 105–106 (e.g., application personality 1 through application personality n) and a core personality 107.

The architecture 100 of the present embodiment forms the basis of the RAgent (Rule Agent) architecture which uses an embedded rule engine for an agent's primary control and decision making. The architecture 100 comprises an agent 101 containing a persistent main rule-based behaviour (e.g., main behaviour 103). In the present embodiment, each RAgent-type agents have this shell. The only difference among them is the rule sets that they are processing in their own rule engines. The main behaviour 103 purpose is two-fold. First, it accepts all incoming messages delivered to the agent 101. An incoming message is asserted into the agent's rule engine knowledge base as an incoming message fact (i.e. a fact whose content is the actual message). Second, this behaviour 103 is the main repository and execution engine where the agent's primary control, decision making, and knowledge base functions occur.

As shown in architecture 100, the agent 101 main behaviour 103 contains an embedded rule-engine 104 implementing the agent's rule-based personality. The agent 101 may in addition have any number of application-oriented, auxiliary behaviours. These behaviours can be dynamically constructed, executed, and deleted as needed (e.g., shown in FIG. 3 below). Each behaviour (e.g., main behaviour 103) has its own separate, distinct rule-engine (e.g., rule engine 104). Behaviours run within a given agent and cannot be accessed or influenced from the outside. Behaviour personalities may be composed of simpler, reusable rule-based personalities (e.g., personalities 105–107). Composing several personalities together with specific customization can produce an individual agent's composite personality (that may or may not be unique) executing in its main behaviour. Likewise, the agent's auxiliary behaviours may also have similarly composed personalities. In either case, a layered composition can build up sophisticated composite action capabilities.

Referring still to FIG. 1, embodiments of the present invention use the concept of a personality (i.e. a cluster of rules, functions, data structures, and global variables) intended to provide a category of functional abilities. A personality (e.g., personalities 105–107) may be thought of as either a reusable application package or a layer in a control hierarchy. In either case, it is a conceptual package implementing some agent capability. In the layered approach as depicted in FIG. 1, each successive layer raises the aggregate behaviour capabilities to higher sophistication. In other words, each successive one of the personalities 105–107 added raises the aggregate behaviour capability.

In the present embodiment, the addition of new personalities can be accomplished in one or both of two ways. First, a new personality (e.g., a new application personality 105) may simply augment the agent's currently accumulated extant personalities (e.g., personalities 106–107). A second way is by adding a new personality layer which has one or more rules and functions that simply name replace (supersede) lower layer personality rules and functions. Layering allows agents of different sophistication levels to be easily constructed from reusable, rule-based capabilities of various personality packages.

In the present embodiment, whenever a RAgent is instantiated, it is automatically imbued with a basic functional layer called the core personality, shown in FIG. 1 as the core personality 107 of the agent 101. The core personality 107 contains the fundamental agent default capabilities which can be replaced or augmented by adding higher level application personality layers. In the above example where an incoming message is asserted into the rule engine fact base by the RAgent's main behaviour 103, if there is no extant application personality rule whose antecedent pattern matches the message fact (e.g. an unexpected message type), then the unrecognized message fact is caught by a default core rule (e.g. core personality 107), generating an appropriate graceful response.

Referring still to architecture 100 of FIG. 1, the RAgent architecture approach of embodiments of the present invention have several distinct advantages. The ability to program (or reprogram) agents by constructing rules brings the agent system developer a higher level of expressiveness over conventional procedural programming languages. This facilitates building agent systems more quickly by reducing the edit-compile-debug loop time. Re-using the same RAgent architecture in which each instance shell is identical except for its own individual rule-base (and hence its own personality) allows more rapid development of functionally heterogeneous agent systems. When a RAgent is instantiated, a construction script argument is passed describing how to build up the particular agent's composite personality. This script specifies what extant personality modules to use, the proper order, and any personality layering. Thus, creating several different RAgent-type agents involves multiple RAgent instantiations, each having a (not-necessarily unique) personality determined by its own construction script argument.

Embodiments of the present invention provide another benefit of using this RAgent approach with respect to developmental flexibility. To facilitate development, a RAgent core personality 107 can be constructed to accept special unique messages which can only be sent from the developer. For example, in a case where the developer needs to "tweak" some rules in a particular application personality of a particular active RAgent instance, the editing can be done off-line while the specific RAgent is still running. After the editing is complete, the developer sends to the specific RAgent-type agent a special reload personality message. Upon validating the message, the RAgent's core personality 107 dynamically reloads the newly modified application personality. Thus the RAgent instance dynamically acquires a change in its functional capability while the agent system and the particular agent are still running (and does not disturb the rule engine fact base).

An example application illustrating the capabilities of the agent architecture of the present embodiment is now described.

Figure 2:
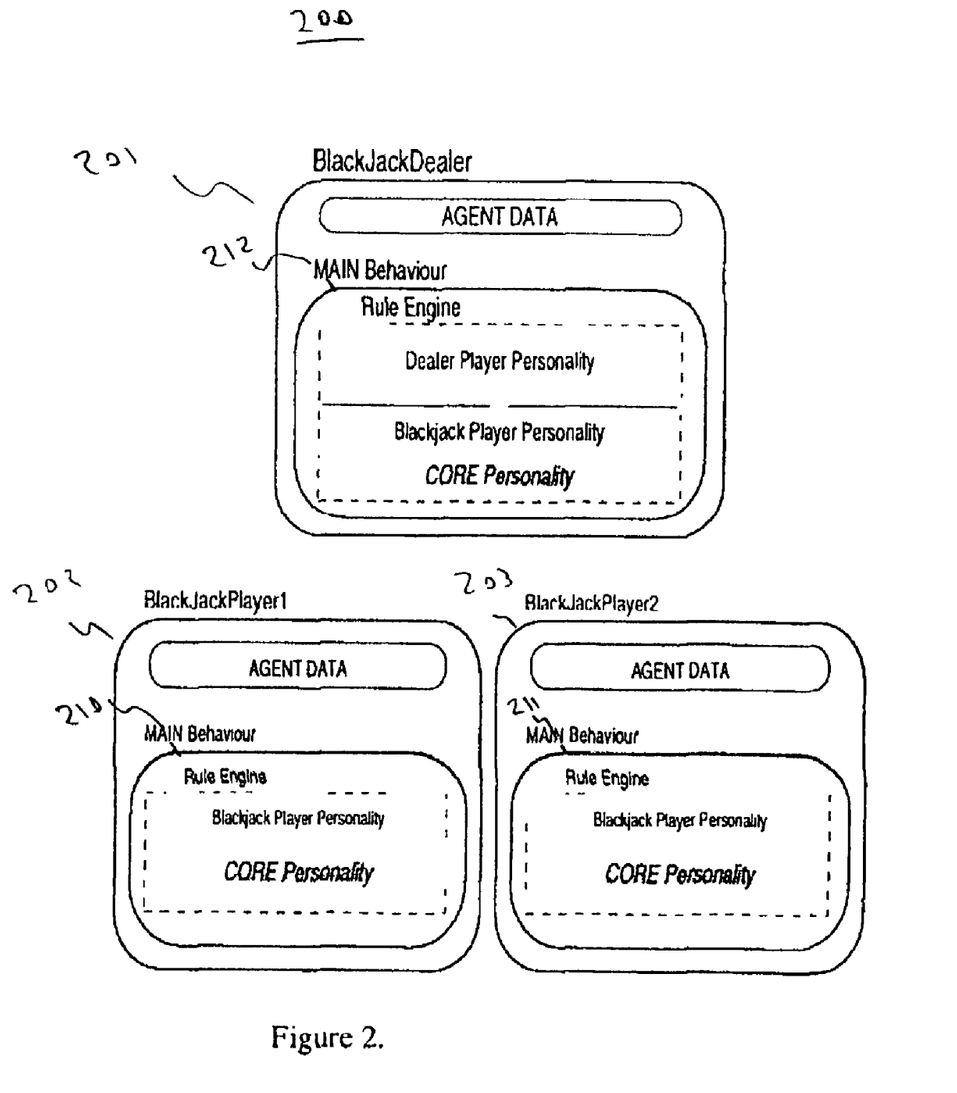
FIG. 2 shows an example where three agents in accordance with one embodiment of the present invention are used to play the card game of blackjack.

FIG. 2 shows an example 200 where three agents 201–203 in accordance with one embodiment of the present invention are used to play the card game of blackjack. As depicted in FIG. 2, two agents 202–203 are regular blackjack players while the third agent 201 is the blackjack dealer.

The two player agents 202–203 are given the same player personality, in this case, main behaviour 210 and main behaviour 211. The third agent 201 is given the dealer personality (e.g., main behaviour 212) which is a layered composition containing the same player personality plus a dealer player personality on the next higher layer. Basically, the dealer agent 201 is a special kind of player agent and can use some of the player personality capabilities, though they may need to be enhanced and refined. For example, the same basic blackjack game regulations for point counting (e.g. not going over 21) applies to both player and dealer. The dealer personality 212, however, has slightly different playing rules such as the hit or hold on 17 rule based on particular style of blackjack being played (e.g. Las Vegas vs. Reno rules) that the regular players (e.g., agents 202–203) do not have. Additionally, the dealer personality 212 has enhanced capabilities for dealing cards, collecting wagers, etc. that the player personalities 210–211 do not have.

To illustrate prototyping flexibility, the blackjack agent game developer while watching game play, may decide to modify the dealer's play (e.g., agent 201) by changing the dealer's hit or hold on 17 rule. After making the rule change offline in the dealer-player personality 212, the developer sends the special reload personality message to the dealer agent 201 to reload its complete personality. Upon message validation, the dealer's core personality immediately performs the reload including the modifications and continues play with the new dealer personality rules and functions.

Thus, as stated above, the RAgent architecture of the present embodiment essentially describes an agent shell in which the agent functionality is represented by a knowledge base of rules, functions, and facts embedded in the agent's main behaviour rule engine.

Figure 3:
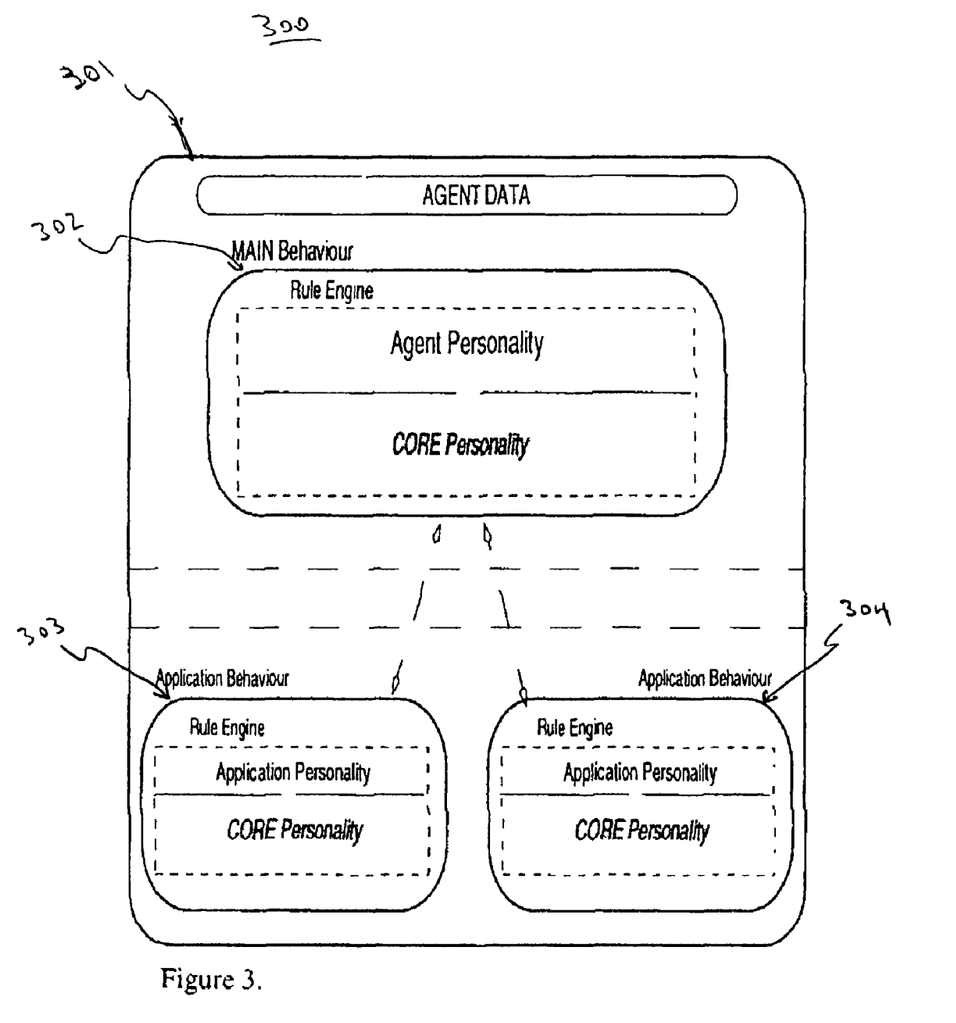
FIG. 3 shows a rule agent having a main behaviour and two concurrent auxiliary application behaviours.

FIG. 3 shows a rule agent 301 having a main behaviour 302 and two concurrent auxiliary application behaviours 303–304. As applications in which agent systems are used become more complex, concurrent, goal processing will become increasingly important for agent-based systems such as personal assistants and meeting agents. When an agent 301 has multiple concurrent goals (each may be hierarchical) that it is trying to satisfy, and embodiment of an agent is utilized wherein the agent is capable of dynamically adding and deleting auxiliary behaviour shells (e.g., application behaviours 303–304).

In the present embodiment, the primary purpose of the auxiliary behaviours 303–304 is to contain a separate, distinct rule-based environment for the subgoal's task processing. Secondarily, it is to take advantage of the host system's subtasking facilities, if available. Goal-directed processing can be realized via spawning and executing a separate auxiliary behaviour for each subgoal node in the goal tree (e.g., shown in FIG. 4 below). Another case is an agent's need for concurrent task processing where each concurrent task is a separate auxiliary behaviour. As depicted in FIG. 3, an auxiliary behaviour shell consists of a behaviour instance, shown as application behaviours 303 and 304, together with its own embedded rule engine.

In the present embodiment, just as the agent 301 main rule engine has a possibly composite or layered personality realized via rules, functions, and facts, each auxiliary behaviour 302–303 also has its own local personality including a special auxiliary behaviour core personality analogous to the agent 301 main core personality. The essential functionality of the auxiliary behaviour core is to provide default behaviour and communications channels with the agent 301 main rule engine, and other auxiliary behaviour rule engines. In one embodiment, each rule engine can assert or modify facts in the other's fact base. This allows the particular behaviour's rule engine to directly exchange information with the agent's main rule engine's fact base and with other behaviours' rule engines directly. In one embodiment, this special access (based on privileges) directly into the other's knowledge base facilitates the transmission of status and synchronization control information.

Figure 4:
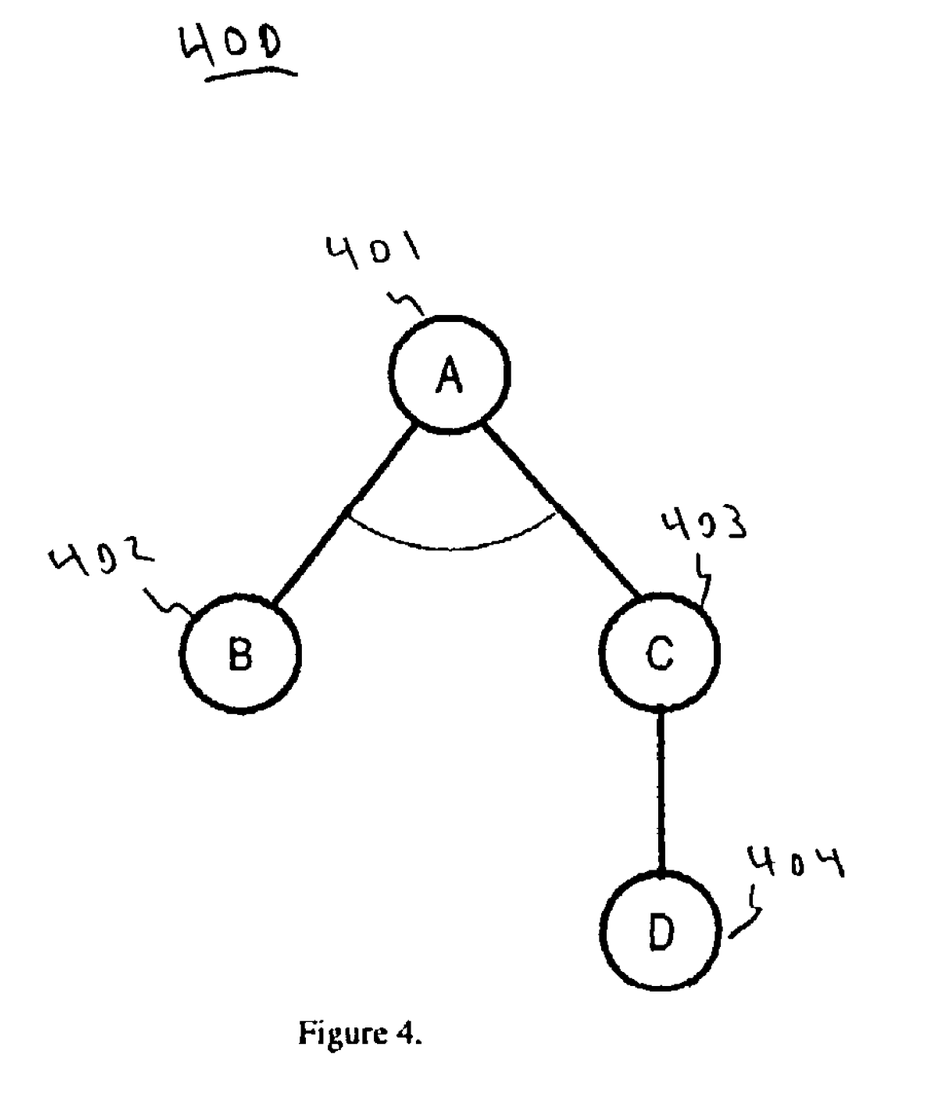
FIG. 4 shows a goal tree in accordance with one embodiment of the present invention, wherein one or more auxiliary behaviour shells are dynamically spawned to pursue concurrent goals.

FIG. 4 shows a goal tree in accordance with one embodiment of the present invention, wherein one or more auxiliary behaviour shells are dynamically spawned to pursue concurrent goals 401–404. For the case where a goal tree 400 contains multi-level, hierarchical subgoals, each subgoal at whatever level can be represented by a separately spawned auxiliary behaviour. FIG. 4 shows a case where node 401 is supported by subgoals 402 and 403. The subgoal 403 is itself supported by subgoal 404. Each subgoal auxiliary behaviour has the responsibility to synchronize with other subgoal behaviours above and below it in the goal tree 400 during processing. This can be especially useful for goal processing having a multilevel goal tree where each tree subgoal node is distinctly represented via a auxiliary behaviour.

For example, in the case shown in FIG. 4 where an agent needs to achieve some goal A 401 for which there already exists a task set (subgoals 402–404 plus the goal tree 400) encoded in rule-based form. Subgoals B 402 and C 403 are conjunctive, but are disjointedly independent and may be processed concurrently. Two concurrent auxiliary behaviours (shown in FIG. 5 below) may be spawned for each subgoal processing. While C 403 is executing, it spawns an auxiliary behaviour to process its subgoal D 404.

Figure 5:
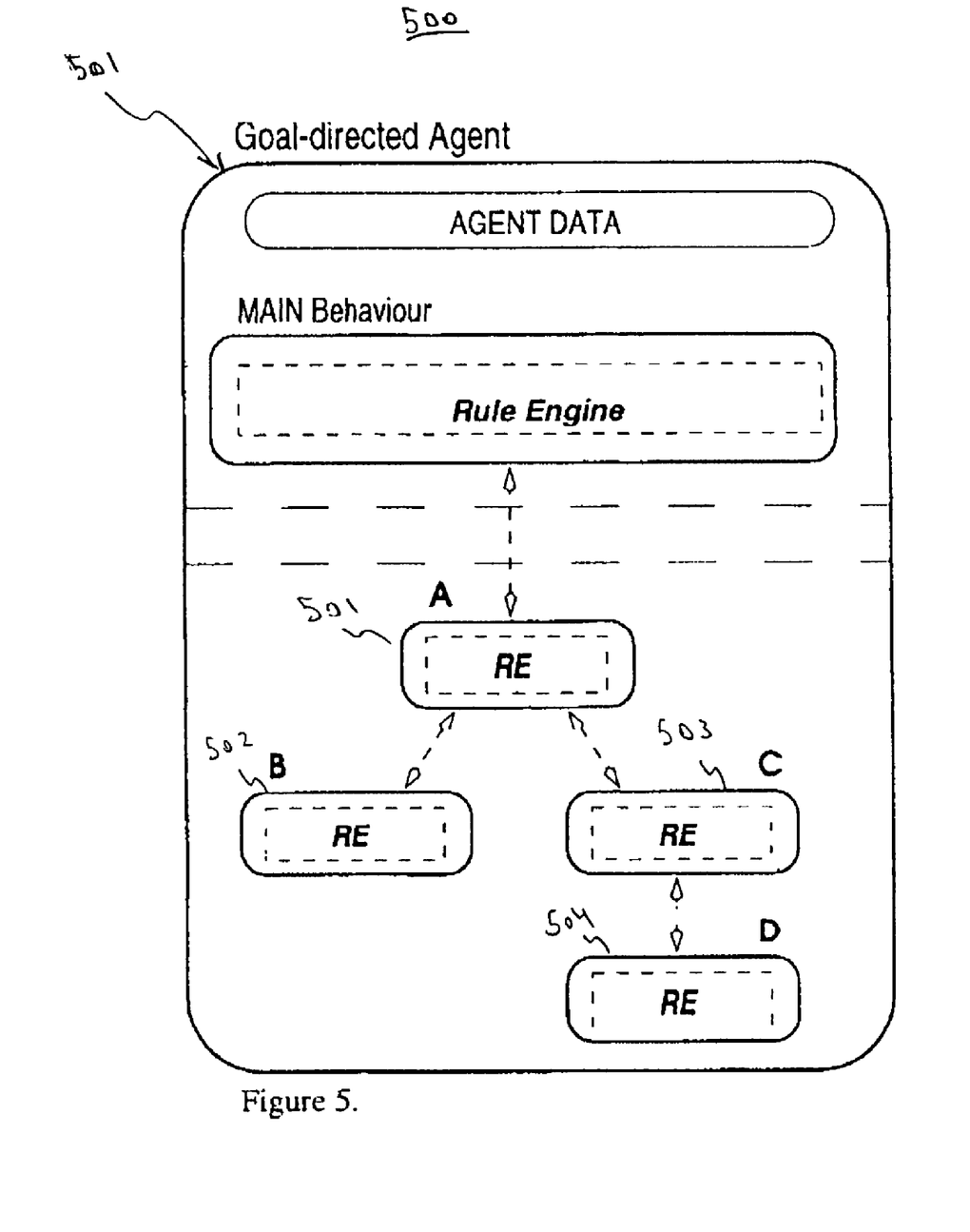
FIG. 5 shows a diagram of a goal directed agent in accordance with one embodiment of the present invention wherein auxiliary behaviours were spawned to accomplish concurrent goal processing.

FIG. 5 shows a diagram 500 of a goal directed agent 501 in accordance with one embodiment of the present invention wherein auxiliary behaviours 501–504 were spawned to accomplish concurrent goal processing. As shown in FIG. 5, the behaviours 501–504 corresponding to the subgoals of the goal tree 400 shown in FIG. 4 and are processed concurrently to achieve the subgoals where necessary (e.g., behaviours 502–503).

Figure 6:
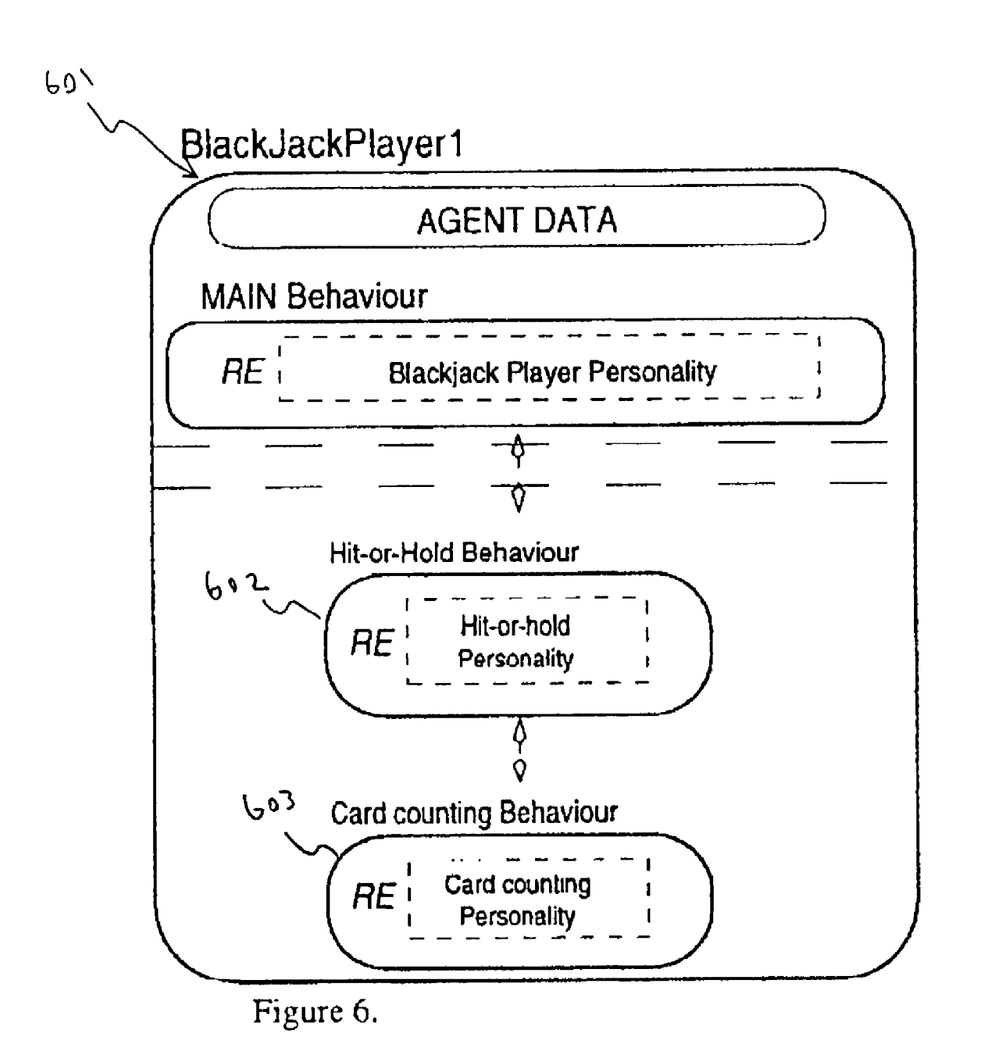
FIG. 6 shows a first implementation of an agent wherein the blackjack example is implemented as an agent in accordance with one embodiment of the present invention having multiple subgoal auxiliary behaviours.
Figure 7:
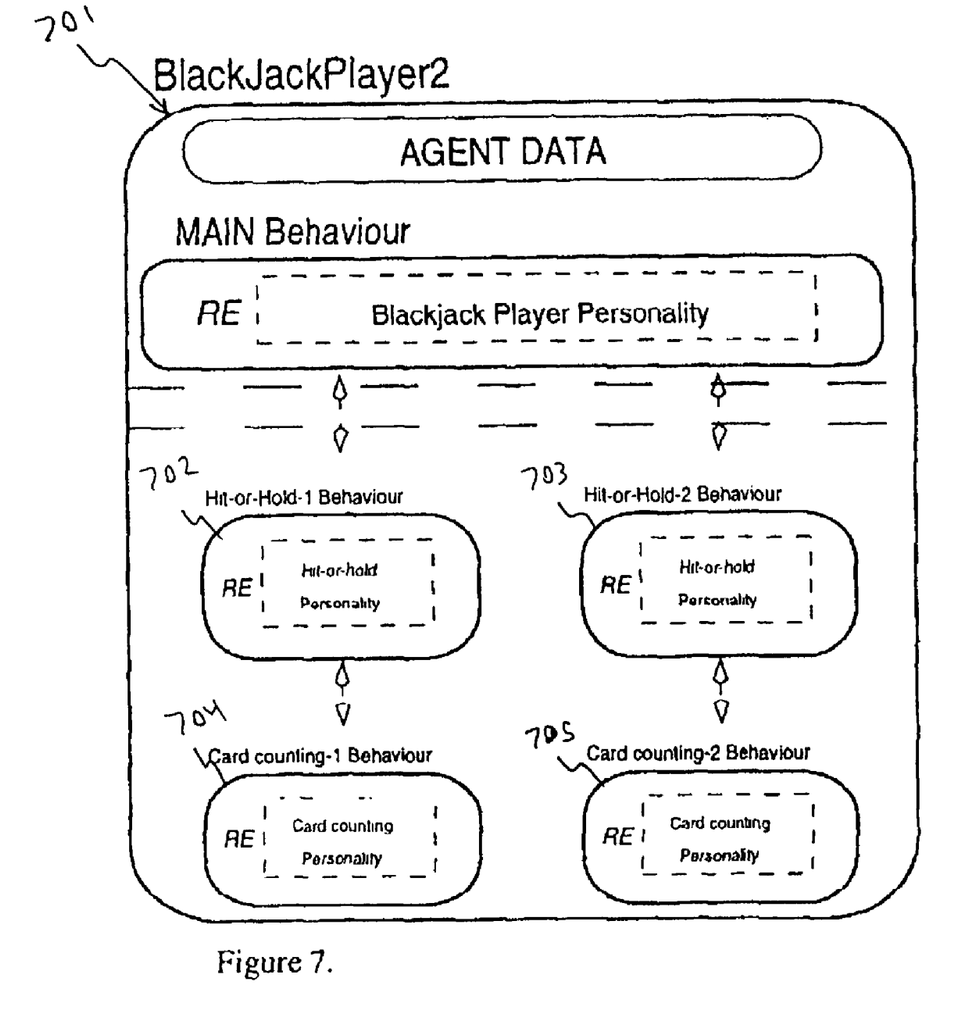
FIG. 7 shows a second implementation of an agent wherein the blackjack example is implemented as an agent in accordance with one embodiment of the present invention having multiple subgoal auxiliary behaviours.

FIG. 6 and FIG. 7 show an implementation of agent 601 and agent 701 wherein the blackjack example described above is implemented as an agent in accordance with one embodiment of the present invention having multiple subgoal auxiliary behaviours. For example, in FIG. 6, if the BlackJackPlayer1 agent 202 in the blackjack example described above in FIG. 2 is re-implemented as an agent having auxiliary behaviour as shown in FIG. 6, it could be implemented as having a subgoal auxiliary behaviour 602 deciding whether to hit-or-hold (accept another card from the dealer or stop). This subgoal might itself use a subgoal behaviour 603 to keep counts for each card played that would affect game play probabilities.

In FIG. 7, likewise, if the BlackJackPlayer2 agent from FIG. 2 is similarly implemented as an agent 701 and has been dealt two cards of identical rank from the BlackJack-Dealer agent, then BlackJackPlayer2 agent 701 may elect to play the split hand. A split hand is actually two concurrent hands, each with one of the two identically ranked cards (e.g. Jack of Diamonds and Jack of Spades) and each hand with an additionally dealt card from the BlackJackDealer. The splitting can easily be represented in the agent 701 via concurrent auxiliary behaviours 702–705.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method for implementing a software agent control architecture, said method comprising:
    generating a plurality of agents, wherein the agents are respectively configured to implement a rule-based behavior;
    accessing respective rule sets for each of the agents, wherein the rule sets are configured for processing using respective rule engines of each of the agents;
    receiving respective incoming messages delivered to the agents;
    implementing the rule-based behavior for each of the agents by processing the incoming messages using the rule engines, wherein a particular set of rules for a particular agent can be changed without requiring one of said incoming messages to include information pertaining to a change to the particular set of rules;
    implementing the rule-based behavior for each of the agents by implementing a personality for each of the agents, wherein different rule sets are used to implement different personalities; and
    using a particular personality for implementing a particular rule-based behavior as a reusable application package to facilitate behavior reuse by dynamically spawning a new rule-based behavior.

2. The computer-implemented method for implementing a software agent control architecture as recited claim 1, further comprising:
    implementing the rule-based behavior for each of the agents by implementing the personality for each of the agents, wherein the rule-based behavior comprises at least one personality for providing a functional capability, and wherein an additional functional capability can be provided to the rule-based behavior by implementing an additional personality.

3. The computer-implemented method for implementing a software agent control architecture as recited claim 2, further comprising:
    using the personality for implementing the rule-based behavior as a layer in a control hierarchy of the rule-based behavior.

4. The computer-implemented method for implementing a software agent control architecture as recited claim 3, further comprising:
    adding a new layer having a new function to augment a lower layer function of the rule-based behavior.

5. The computer-implemented method for implementing a software agent control architecture as recited claim 3, further comprising:
    adding a new layer having a new function to replace a lower layer function of the rule-based behavior.

6. The computer-implemented method for implementing a software agent control architecture as recited claim 1, further comprising:
    implementing a basic functional layer for the rule-based behavior such that each of the agents are automatically imbued with a core personality when initially instantiated.

7. A computer-readable medium embodying instructions that cause a computer to perform method for implementing a software agent control architecture, said method comprising: instantiating a plurality of agents, wherein the agents are respectively configured to implement a rule-based behavior;
    instantiating respective rule sets for each of the agents, wherein the rule sets are configured for processing using respective rule engines of each of the agents;
    accepting respective incoming messages delivered to the agents;
    generating the rule-based behavior for each of the agents by processing the incoming messages using the rule engines, wherein a particular set of rules for a particular agent can be changed without requiring one of said incoming messages to include information pertaining to a change to the particular set of rules;
    generating the rule-based behavior for each of the agents by implementing a personality for each of the agents, wherein different rule sets are used to implement different personalities; and
    using the personality for implementing the rule-based behavior as a reusable application package to facilitate behavior reuse by dynamically spawning a new rule-based behavior.

8. The computer-readable medium for implementing a software agent control architecture as recited claim 7, further comprising:
    generating the rule-based behavior for each of the agents by implementing the personality for each of the agents, wherein the rule-based behavior comprises at least one personality for providing a functional capability, and wherein an additional functional capability can be provided to the rule-based behavior by implementing an additional personality.

9. The computer-readable medium for implementing a software agent control architecture as recited claim 8, further comprising:
    using the personality for implementing the rule-based behavior as a layer in a control hierarchy of the rule-based behavior.

10. The computer-readable medium for implementing a software agent control architecture as recited claim 9, further comprising:
    adding a new layer having a new function to augment a lower layer function of the rule-based behavior.

11. The computer-readable medium for implementing a software agent control architecture as recited claim 9, further comprising:
    adding a new layer having a new function to replace a lower layer function of the rule-based behavior.

12. The computer-readable medium for implementing a software agent control architecture as recited claim 7, further comprising:

implementing a basic functional layer for the rule-based behavior such that each of the agents are automatically imbued with a core personality when initially instantiated.

13. An apparatus for implementing a software agent control architecture, comprising:
   means for generating a plurality of agents, wherein the agents are respectively configured to implement a rule-based behavior;
   means for accessing respective rule sets for each of the agents, wherein the rule sets are configured for processing using respective rule engines of each of the agents;
   means for receiving respective incoming messages delivered to the agents;
   means for implementing the rule-based behavior for each of the agents by processing the incoming messages using the rule engines, wherein a particular set of rules for a particular agent can be changed without requiring one of said incoming messages to include information pertaining to a change to the particular set of rules;
   means for implementing the rule-based behavior for each of the agents by implementing a personality for each of the agents, wherein different rule sets are used to implement different personalities; and
   means for using the personality for implementing the rule-based behavior as a reusable application package to facilitate behavior reuse by dynamically spawning a new rule-based behavior.

14. The apparatus for implementing a software agent control architecture as recited claim 13, further comprising:
   means for implementing the rule-based behavior for each of the agents by implementing the personality for each of the agents, wherein the rule-based behavior comprises at least one personality for providing a functional capability, and wherein an additional functional capability can be provided to the rule-based behavior by implementing an additional personality.

15. The apparatus for implementing a software agent control architecture as recited claim 14, further comprising:
   means for using the personality for implementing the rule-based behavior as a layer in a control hierarchy of the rule-based behavior.

16. The apparatus for implementing a software agent control architecture as recited claim 13, further comprising:
   means for adding a new layer having a new function to augment a lower layer function of the rule-based behavior.

17. The apparatus for implementing a software agent control architecture as recited claim 13, further comprising:
   means for adding a new layer having a new function to replace a lower layer function of the rule-based behavior.

18. The apparatus for implementing a software agent control architecture as recited claim 13, further comprising:
   means for implementing a basic functional layer for the rule-based behavior such that each of the agents are automatically imbued with a core personality when initially instantiated.

* * * * *